United States Patent [19]

Roden

[11] Patent Number: 4,907,400
[45] Date of Patent: * Mar. 13, 1990

[54] AGRICULTURAL MOWER HAVING MEANS FOR RAISING THE REEL TO A CLEARING HEIGHT WHEN THE CUTTER BAR ENGAGES AN OBSTACLE

[76] Inventor: Thomas V. Roden, 3775 Hwy. I, Saukville, Wis. 53080

[*] Notice: The portion of the term of this patent subsequent to May 3, 2005 has been disclaimed.

[21] Appl. No.: 242,884

[22] Filed: Sep. 12, 1988

[51] Int. Cl.[4] .................... A01D 75/18; A01D 34/04; A01D 67/00
[52] U.S. Cl. ...................................... 56/10.4; 56/15.8; 56/DIG. 10; 56/DIG. 22
[58] Field of Search ........... 56/10.4, 15.7, 15.8, 56/17.1, 17.2, DIG. 10, DIG. 22

[56] References Cited

U.S. PATENT DOCUMENTS

| | | | |
|---|---|---|---|
| 2,732,675 | 1/1956 | Smith et al. | 56/10.4 |
| 3,959,957 | 6/1976 | Halls | 56/15.8 |
| 4,011,709 | 3/1977 | Mott et al. | 56/10.4 |
| 4,407,110 | 10/1983 | McIlwain et al. | 56/15.3 |
| 4,565,056 | 1/1986 | Heidjann | 56/15.8 |
| 4,747,255 | 5/1988 | Roden | 56/10.4 |

*Primary Examiner*—Bruce M. Kisliuk
*Attorney, Agent, or Firm*—Emrich & Dithmar

[57] ABSTRACT

The disclosure relates to an agricultural mower having a cutter mechanism for cutting the crop and a reel for guiding the crop into the cutter bar and lifting the crop after it is cut. The machine includes a pair of parallel swing arms on each side of the cutter bar for permitting the cutter mechanism when it strikes an obstacle to swing primarily rearwardly initially and then upwardly to a clearing height as the arms swing pendulum-like. The side support arms for the reel are connected to the cutter bar assembly by lift links constructed and arranged to raise the reel upon initial rearward movement of the cutter mechanism so that the real assembly will also clear the obstruction without damage.

5 Claims, 1 Drawing Sheet

AGRICULTURAL MOWER HAVING MEANS FOR RAISING THE REEL TO A CLEARING HEIGHT WHEN THE CUTTER BAR ENGAGES AN OBSTACLE

BACKGROUND OF THE INVENTION

The present invention relates to an agricultural mower having a cutting mechanism such as a reciprocating cutter bar or rotary cutter for mowing a crop and a rotary reel for guiding the crop into the cutter and then raking the cut crop and moving it into conditioner rolls, if present, and thence through a windrower, if desired, for placing the cut, conditioned crop in a windrow for later pick up by a bailing machine.

Agricultural mowers of this type are widely used for harvesting varying kinds of crop, particularly hay and forage crops such as alfalfa. The mowers may either be self-propelled or adapted to be pulled by an agricultural tractor, as is the embodiment illustrated herein.

Moreover, there are variations in the types of equipment used for mowing. For example, not all mowers condition the crop, and not all mowers form the cut crop into a windrow. Some mowers simply leave the crop in a swath having substantially the same width as the cut swath. Thus, the embodiment disclosed herein of the cutting and conditioning mechanism is for exemplary purposes only and is not intended to limit the scope of the invention, as persons skilled in the art will readily appreciate.

In an effort to cut as much of the crop as possible for harvesting, the cutter mechanism, whether it is a reciprocating or a rotary-type cutting mechanism, is located close to the ground. Because at the time of harvest, the crop is usually comparatively high and thick, it is difficult to see obstructions such as rocks, stumps or partially buried logs. Should the cutter mechanism strike such an obstruction, it can not only cause damage to the individual cutting blade which strikes the obstacle; but since most cutting mechanisms are driven from a common source, a bent blade can have the effect of stopping the entire cutting mechanism or damaging a blade by causing breakage.

Thus, there have been attempts to reduce damage to the cutter guards in the case of a reciprocating cutter-bar mowing mechanism, for example. There have been other attempts to reduce damage to the cutting mechanism. One such attempt is disclosed in my U.S. Pat. No. 4,747,255 for CUTTER-BAR L. SUPPORT, issued May 31, 1988. In that patent, there is described a suspension system for a reciprocating cutter bar assembly which includes a parallel linkage suspension mechanism on each side of the cutter bar assembly. The suspension mechanism includes swing arms which, in the use position, are substantially vertically oriented and interconnect the mower main frame with a movable cutter bar assembly, enabling the cutter-bar assembly, should it strike an object, to respond by moving first primarily rearwardly relative to the direction of travel of the main frame, and then, in a pendulum-type movement, to elevate the cutter bar assembly above the obstruction to clearing height. This mechanism enables the mower to travel at normal ground speeds while permitting the cutter bar assembly to react quickly in the event an obstacle is encountered by moving primarily rearwardly and then upwardly.

SUMMARY OF THE INVENTION

The present invention improves upon the type of cutter bar support mechanism disclosed in my U.S. Pat. No. 4,757,255. In the case where an obstruction is high enough, it can have the effect of striking the reel assembly itself, thereby possibly damaging the reel. This is so even though the cutter bar assembly may be moved upwardly to clear the obstacle. The problem encountered in moving the reel assembly is that ordinarily the cutter bar assembly of the type disclosed in my patent moves independently of th reel assembly. The present invention overcomes this problem by including a pair of lift links, one on each side of the reel, interconnecting the frame of the cutter bar assembly with the reel support arms in such a fashion that when the cutter bar assembly begins to move rearwardly in response to striking an object, the lift arms move from an inclined position to a more vertical position, thereby causing an initial vertical lift of the reel even as the cutter assembly moves primarily rearwardly.

Thus, the present invention includes a combination of a suspension system for a cutter mechanism which permits it to move primarily rearwardly when an object is struck by the cutter and, as the cutter moves rearwardly, to lift the reel so that it, too, clears the obstacle. Various modifications may be included such as counterbalancing either the cutter mechanism, the reel or both to reduce reaction time and to at least partially to offset the mass of the portions of the machine that must be moved from the normal use position to the clearance position when an object is struck.

Other features and advantages of the present invention will be apparent to persons skilled in the art from the following detailed description of a preferred embodiment accompanied by the attached drawing wherein identical reference numerals will refer to like parts in the various views.

DETAILED DESCRIPTION OF THE ILLUSTRATED EMBODIMENT

Figure 1:
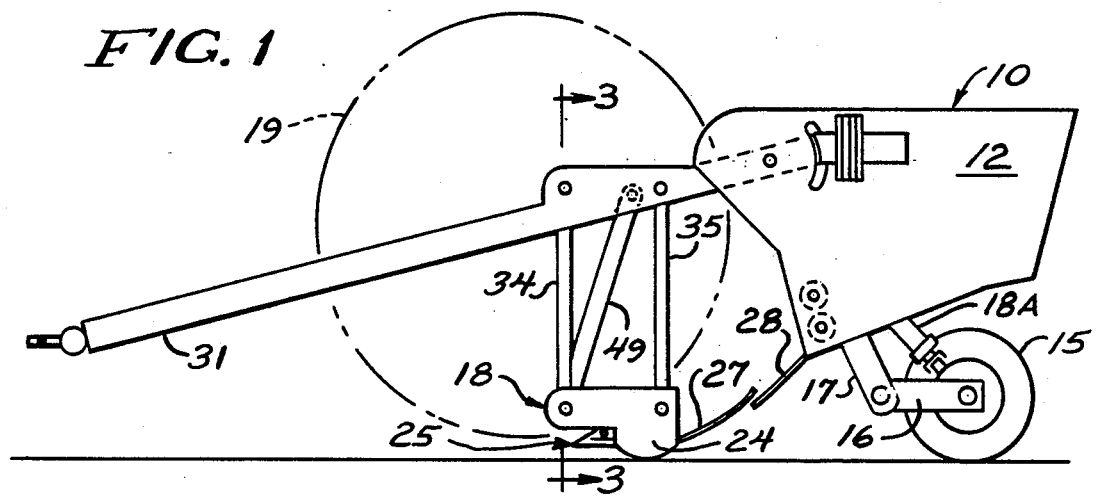
FIG. 1 is a left side view of an agricultural mower incorporating the present invention with a cutter bar assembly and a reel in the normal use position.
Figure 2:
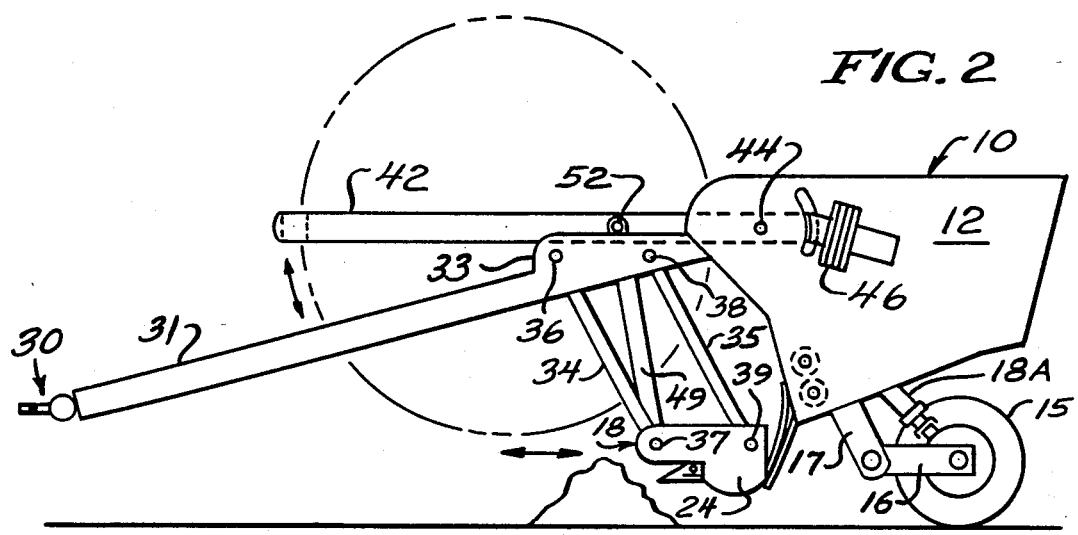
FIG. 2 is a view of the machine similar to FIG. 1 with the cutter bar assembly and the reel raised to clear an obstacle.

Referring now to the drawing, an agricultural mower has a main frame generally designated 10 which may be conventional in the form of a main rear beam 11 extending transverse of the direction of travel and including side panels 12, 13. The main frame is supported by a pair of wheels, one of which is seen in FIGS. 1 and 2 and designated 15. The wheel 15 is connected to a wheel arm 16 which is pivotally mounted to a wheel support 17 connected, in turn, to the main frame. A hydraulic cylinder 18A is interconnected between the wheel arm 16 and the wheel support 17 to raise and lower the main frame between a transport position in which the machine is elevated and a use position in which the machine is lowered as seen in FIG. 1.

Figure 3:
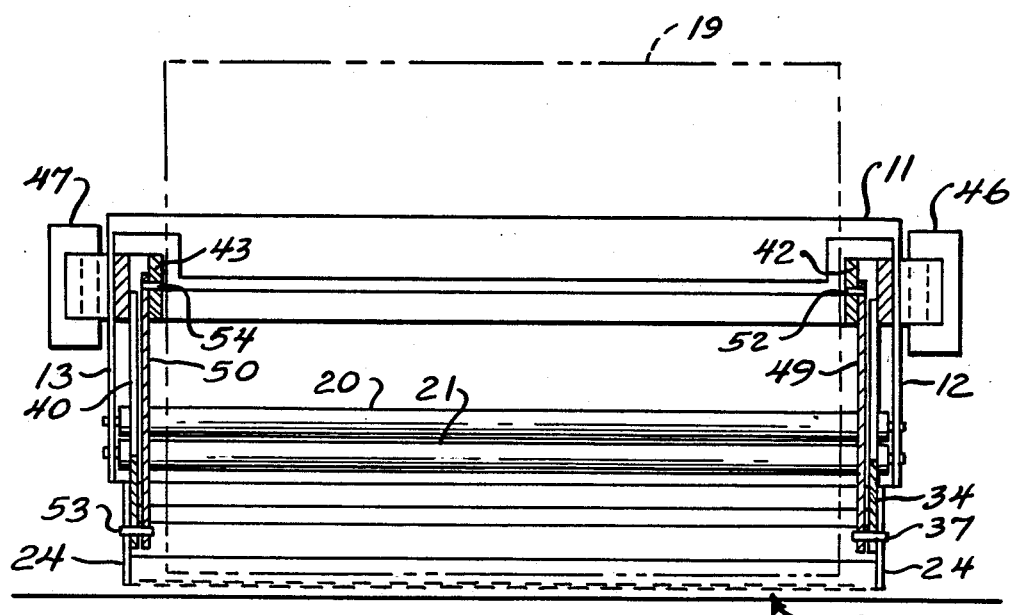
FIG. 3 is a larger, elevational view of the mower of FIG. 1 taken from the front, that is the left as viewed in FIG. 1.

Referring then to FIG. 1, the machine of the illustrated embodiment includes a cutter bar assembly 18, a reel diagrammatically illustrated by the large circle in chain line designated 19, and a pair of conditioning rolls 20, 21 (FIG. 3).

The cutter bar assembly includes a cutter bar frame 24 for mounting a conventional reciprocating cutter bar generally designated 25 and extending transversely across the width of the machine for cutting the crop. A conventional drive mechanism (not shown) drives the cutter bar in reciprocation for cutting the crop in a scissors-like fashion. Alternatively, rotary cutters can equally well be employed.

By way of illustrating the operation, when the cutter bar 25 cuts the crop, the reel 19 (driven in rotary motion in a counterclockwise direction as viewed in FIGS. 1 and 2), guides the crop into the cutter mechanism and then feeds it across a pair of overlapping baffles 27, 28 into the conditioning rolls which are also driven and which are spaced to crush the stem of the hay and then feed it into a windrower which deposits the cop out the rear of the machine in a narrow row on the field for drying.

The mower is drawn through the field by means of a tractor which is connected to the apparatus by means of a conventional hitch generally designated 30 and located at the forward end of a tongue or draft member 31, the rear portion of which is connected to the main frame 10 of the mower. In the illustrated embodiment, the tongue 31 is located to the left side of the machine so that the machine is designed to operate to the right of the tractor outboard of the tractor wheels. This permits the tractor to straddle a previously-formed windrow and enables the mower to operate in a swath which is not trampled by the tractor tires. Persons skilled in the art will readily appreciate that the invention could be adapted to a mower without conditioning rolls or a windrowing capacity, or to one having the tongue connected to the center of the transverse beam 11 rather than at the side as in the illustrated embodiment.

The cutter bar assembly 18 is mounted to a forwardly extending portion 33 of the main frame 10 by means of two pairs of parallel suspension linkages. The left side parallel linkage is seen in FIGS. 1 and 2 as including a forward suspension link 34 and a rear suspension link 35. The top of the forward link 34 is pivotally connected at 36 to the main frame, and pivotally connected at 37 to the cutter bar frame 24. Similarly, the top of the rear link 35 is pivotally connected at 38 to the main frame, and the bottom of link 35 is pivotally connected at 39 to the cutter bar frame. A similar pair of parallel suspension links interconnects the right side of the main frame with the right side of the cutter bar frame 24, one such link being designated 40 as seen in FIG. 3.

In the illustrated embodiment, the links 34 and 35, together with the portion of the main frame between pivots 36 and 38 and the portion of the cutter bar frame between pivots 37 and 39 form a parallel suspension linkage, or, in more general terms, a "four-bar suspension linkage".

As explained in my '255 patent, the suspension links 34, 35, as well as the pair of suspension links on the far side, enable the cutter bar frame and assembly to swing rearwardly in a pendulum-like action wherein the initial motion in a rearward direction is primarily toward the rear, whereas as the cutter bar frame rotates more counterclockwise, the motion becomes an elevating or raising motion, as seen by comparing FIGS. 1 and 2 in the drawing. Although the suspension links illustrated are parallelogram linkages, it is not necessary that they be true parallelograms. A four-bar linkage could equally well be employed.

The reel 19 is supported by a pair of forwardly extending arms 42, 43 (FIG. 3) which are pivotally connected to the main frame, the pivotal connection for the left side arm 42 being shown at 44 in FIG. 2. The reel support arms 42, 43 extend rearwardly of their respective pivotal connections to the main frame 10, and they are provided with counter weights as at 46, 47 respectively at least partially to offset or counterbalance the weight of the cantilevered reel 19. The reel 19 thus may be raised from its use position seen in FIG. 2 to an elevated travel position if desired.

A pair of side lift links 49, 50 are connected between the cutter bar support frame 24 and the reel support arms 42, 43, respectively. Thus, the left side lift link 49 has its bottom portion pivotally connected to the pivot 37; and its upper end pivotally connected at 52 to the reel support arm 42. The upper pivot 52 is located to the rear of a vertical plan passing through the lower pivot 37. Similarly, the right side lift link 50 is pivotally connected at 53 to the cutter bar frame, and its upper end is pivotally connected at 54 to the right side reel support arm 43. The lift links 49, 50 extend in the same general plane in the various positions of use if the reel is moved as a unit. However, an advantage of the present invention is that if one side of the cutter mechanism engages an obstacle, that side may be raised while leaving the other side in the use position, depending, of course, on the size of the obstacle.

It will be observed from FIG. 1 that in the normal use position, the lift links extend upwardly and rearwardly from their respective pivotal connections to the cutter bar frame 24. Thus, as the cutter bar frame 24 moves in its initial motion rearwardly when the cutter bar strikes an obstacle, as illustrated in FIG. 2 for example, the lift link 49 pivots counterclockwise about its upper pivot 52. However, the suspension links 34, 35 are connected to the main frame extension 33, and that frame is supported by the tractor hitch 30 and the rear wheels 15 so that it maintains a constant elevation. As the lift link 49 thus rotates counter-clockwise, the reel support arms 42, 43 will be raised immediately even though the initial movement of the cutter bar frame is primarily horizontal. This is so because the horizontal distance between the two pivots 52, 37 is shorter when the cutter bar frame 24 is in the normal use positions of FIG. 1; and that distance increases as the lower end of the lift arm 49 begins to move rearwardly beneath the upper pivot 52.

As the movement of the cutter bar frame 24 progresses rearwardly, and the vertical motion begins to take effect, then the reel is moved at an ever increasing rate and responds to the rearward movement of the cutter bar frame, at least until the lower pivot 37 passes beneath or "under center" relative to the upper pivot 52.

It will thus be appreciated that the present invention not only accommodates a quick response of the cutter bar assembly to engaging an obstacle when the machine is being pulled in a forward direction so as to displace the cutter bar assembly from the use position (FIG. 1) to a clearing position (FIG. 2), but the side lift links 49, 50 also provide a quick vertical action responsive to the rearward motion of the cutter bar frame to elevate the reel support arms, and thus the reel itself, from the use position (FIG. 1) to a raised or clearing position (FIG. 2).

As mentioned, the illustrated embodiment is directed to a mower having a reciprocating cutter, side pivot draft member, conditioning rolls and windrowing capacity. The invention may be used with any one or more of these conventional features, or without any of them. Other modifications, deletions or additions are also possible.

Having thus disclosed in detail one embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. In an agricultural mower having a wheel-supported main frame a cutter mechanism extending across the width of the frame for cutting a swath of crop and having first and second sides; a reel driven in rotary motion about a horizontal axis transverse of the direction of travel of said mower and first and second support arm means for supporting said reel in cantilever in front of said main frame and above said cutter mechanism, the improvement comprising: first and second four-bar suspension linkages for mounting respectively said first and second sides of said cutter mechanism to said main frame for permitting said cutter mechanism to move in pendulum-type motion when striking an obstacle on the ground, said suspension linkages being generally vertical in the normal use position whereby the initial movement of said cutter mechanism is primarily rearward and thence upward when an obstacle is struck; and first and second lift linkage means interconnecting said first and second sides of said cutter mechanism respectively with said first and second reel support arms means, said suspension linkages, lift linkage means and reel support arms means being constructed and arranged to raise said reel when said cutter mechanism engages an obstacle.

2. The apparatus of claim 1 wherein said first and second lift linkage means each comprises an elongated link pivotally connected at its lower end to one of said first and second side of said cutter mechanism and pivotally connected at its upper end to one of said reel support arms means.

3. The apparatus of claim 2 wherein the upper pivotal connection of each lift link in the normal use position is located toward the rear of a vertical plane passing through the lower pivotal connection of the associated lift link to said cutter mechanism such that said lift links are generally parallel to each other and extend upwardly and rearwardly from their respective lower pivotal connections to said cutter mechanism, whereby when said cutter mechanism strikes an obstacle and moves rearwardly, the vertical distance between the upper and lower pivotal connections of said lift links increases thereby to raise said reel from its use position to a clearing position at least during the initial rearward movement of said cutter mechanism.

4. The apparatus of claim 1 characterized in that said suspension linkages and lift linkages means on each side of said mower cooperable with one another to raise their associated ends of said cutter mechanism and reel in unison and independently of the corresponding suspension linkage and lift linkage means on the other side of said mower.

5. The apparatus of claim 4 wherein said mower is characterized as an agricultural crop mower adapted to be pulled by a tractor and further includes a draft member connected to said main frame and including a hitch means for connection said draft member to a tractor.

* * * * *